(12) United States Patent
Nakagawa et al.

(10) Patent No.: US 8,677,820 B2
(45) Date of Patent: Mar. 25, 2014

(54) INPUT APPARATUS

(75) Inventors: Toshiyuki Nakagawa, Kanagawa (JP);
Masatoshi Ueno, Kanagawa (JP);
Kenichi Kabasawa, Saitama (JP); Hideo Kawabe, Saitama (JP); Shinobu Kuriya, Kanagawa (JP); Tetsuro Goto, Tokyo (JP); Tsubasa Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 13/178,605

(22) Filed: Jul. 8, 2011

(65) Prior Publication Data

US 2012/0011932 A1    Jan. 19, 2012

(30) Foreign Application Priority Data

Jul. 15, 2010    (JP) .................................. 2010-160310

(51) Int. Cl.
*A61B 1/24* (2006.01)
(52) U.S. Cl.
USPC ........................................................ 73/379.02
(58) Field of Classification Search
USPC .......................................... 73/379.02, 379.01
See application file for complete search history.

(56) References Cited

U.S. PATENT DOCUMENTS 5,467,656 A * 11/1995 Teare et al. ............... 73/862.541
5,681,993 A * 10/1997 Heitman .................... 73/379.02
7,631,557 B2 * 12/2009 DeBeliso et al. .......... 73/379.02
7,739,910 B2 *  6/2010 Clem et al. ................. 73/379.02
2009/0040175 A1    2/2009 Xu et al.
2013/0027294 A1 *  1/2013 Nakagawa et al. ........... 345/156

FOREIGN PATENT DOCUMENTS

JP    64-028720    1/1989

OTHER PUBLICATIONS

European Search Report dated Dec. 19, 2011 in connection with counterpart EP Application No. 11 17 0665.

* cited by examiner

*Primary Examiner* — Jewel V Thompson
(74) *Attorney, Agent, or Firm* — Sony Corporation

(57) ABSTRACT

An input apparatus includes: an input apparatus main body that is used to make an input for operating an operation target; a grip detection portion configured to detect that a user has gripped the input apparatus main body with a predetermined force or more; a motion detection portion configured to detect a movement of the input apparatus main body and output a movement detection value corresponding to the movement of the input apparatus main body; a controller configured to execute, while/after the grip of the input apparatus main body is being detected by the grip detection portion, processing for controlling the operation target based on the movement detection value; and a first response portion configured to return, when at least the grip of the input apparatus main body is detected by the grip detection portion, a first response to the user irrespective of the control of the controller.

15 Claims, 12 Drawing Sheets

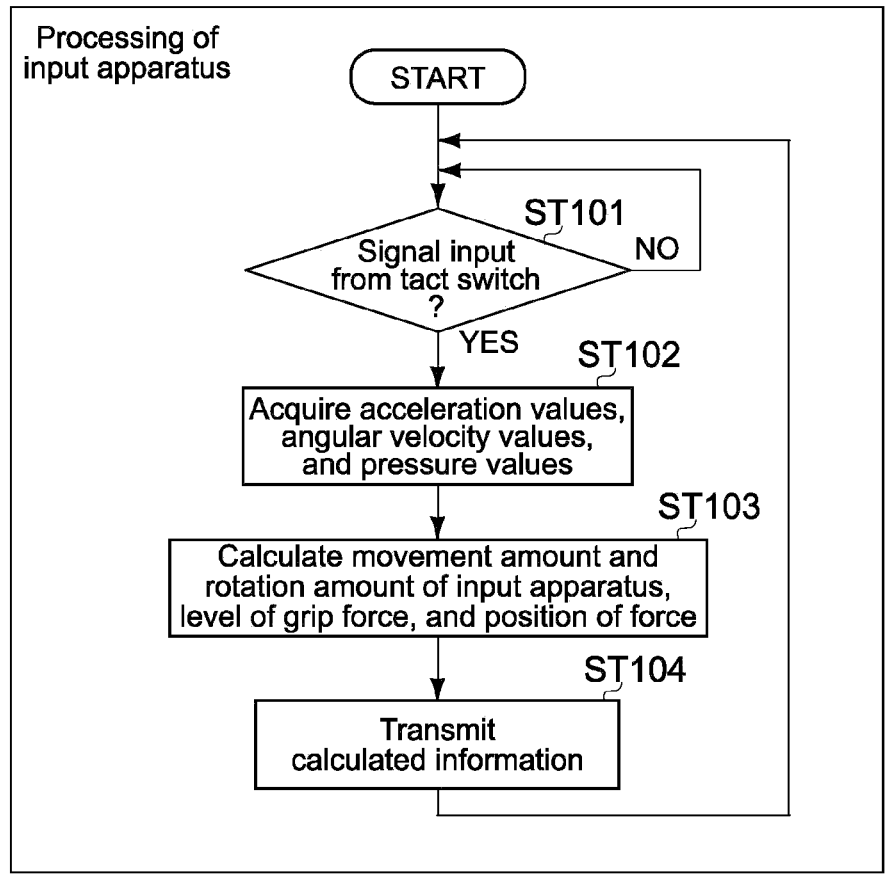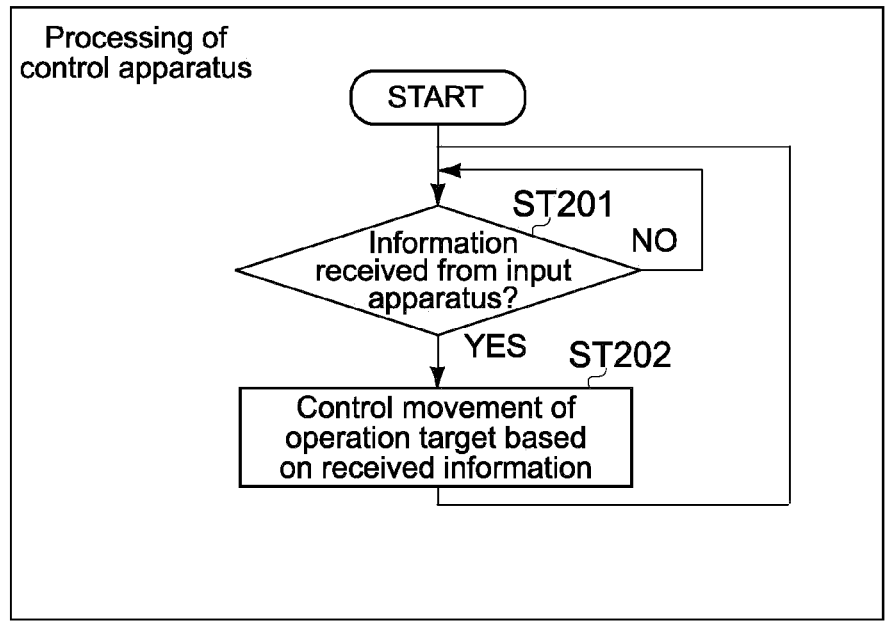
FIG.7

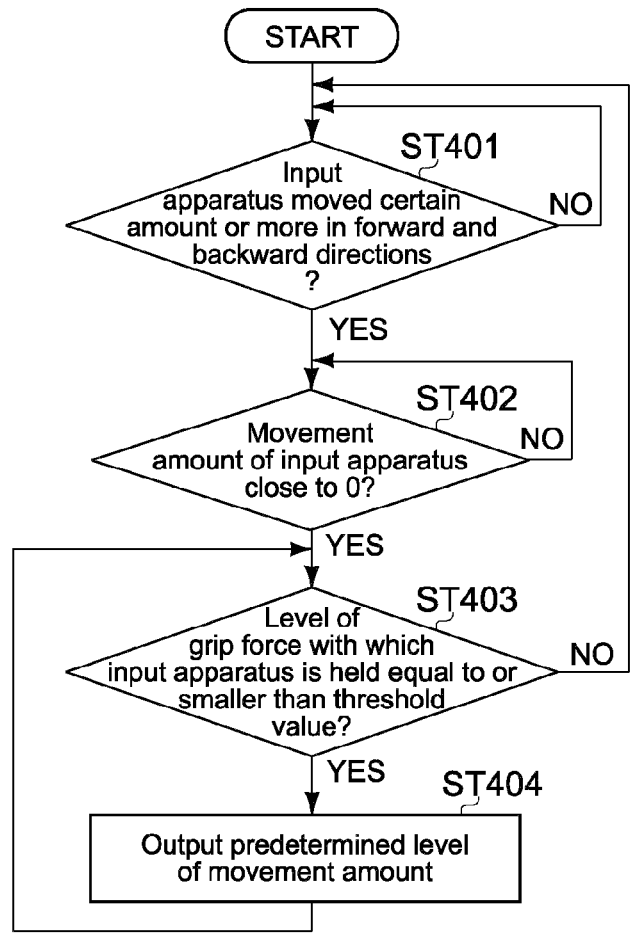
FIG.11
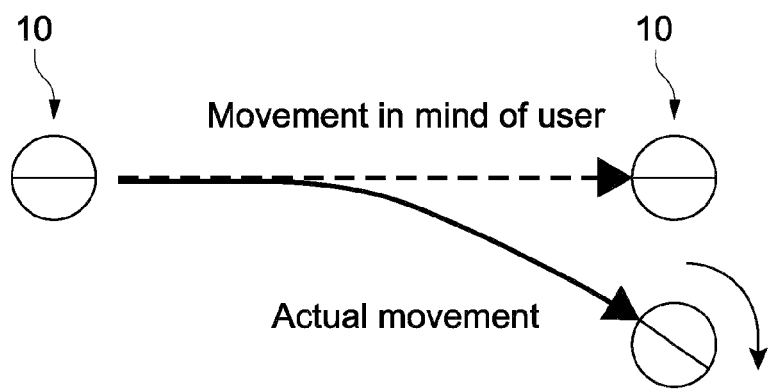
FIG.12    Rotation → Error

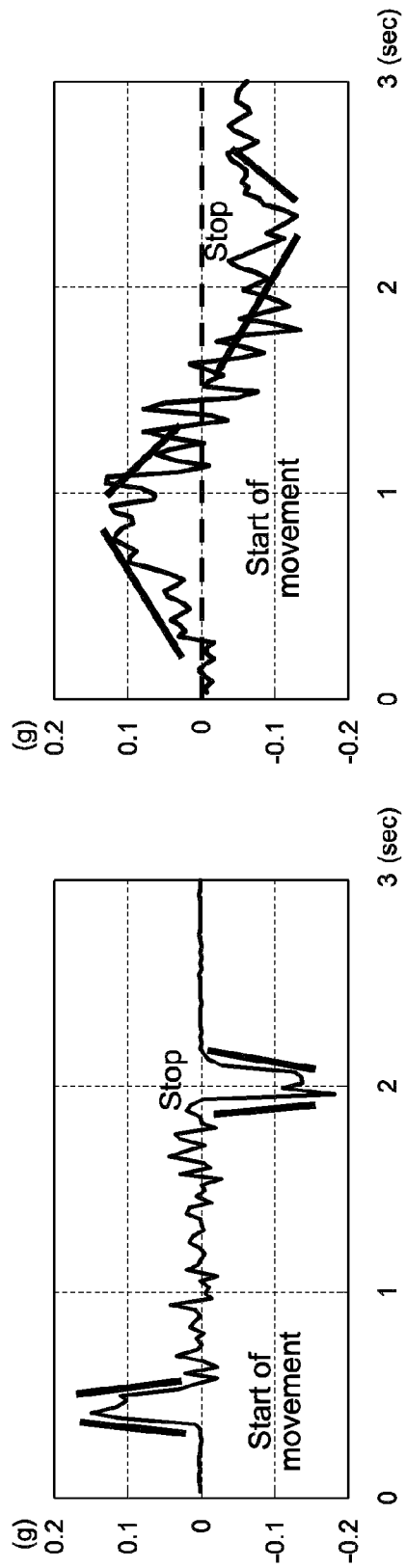

INPUT APPARATUS

BACKGROUND

The present disclosure relates to an input apparatus to which inputs for operating an operation target 2- or 3-dimensionally, for example, are input.

For example, a mouse is widely used as an input apparatus for operating GUIs (Graphical User Interfaces) displayed 2-dimensionally on a display. In recent years, various 3-dimensional-operation-type input apparatuses are proposed in addition to planar-operation-type input apparatus typified by a mouse (see, for example, Japanese Patent Application Laid-open No. Sho 64-28720 (second page, FIGS. 1 to 3); hereinafter, referred to as Patent Document 1).

Patent Document 1 discloses a three dimension data input device having a spherical shape. The three dimension data input device includes a spherical shell 11 that is filled inside with liquid or a solid substance and a plurality of pressure sensors 13 to 15 provided on an inner surface of the spherical shell 11. As a user holds the three dimension data input device and moves it 3-dimensionally, a pressure fluctuation is caused in proportion to an acceleration on the inner surface of the spherical shell, and the pressure fluctuation is measured by the pressure sensors 13 to 15. A processing section 17 executes operations based on the sensor outputs of the pressure sensors 13 to 15 to calculate a 3-dimensional movement amount and rotation of the three dimension data input device in space.

SUMMARY

For example, when a user operates an operation target using the 3-dimensional-operation-type input apparatus as described in Patent Document 1, the operation target may make a move unintended by the user unlike the planar-operation-type input apparatus such as a mouse.

When the user holds the input apparatus that is placed on a table and picks it up to start operating an operation target, for example, the operation target moves in an interlocking manner with the operation against the intention of the user.

In this regard, a technique that enables a user to arbitrarily switch whether to reflect an operation of an input apparatus on an operation of an operation target is being demanded. Moreover, a technique that is capable of giving a quick response to a user when the user shows an intention to start operating an operation target and makes an input that shows the intention to the input apparatus is also being demanded.

In view of the circumstances as described above, there is a need for an input apparatus that enables a user to arbitrarily switch whether to reflect an operation of an input apparatus on an operation of an operation target and is capable of giving a quick response to a user when the user makes an input that shows an intention to start operating an operation target to the input apparatus.

According to an embodiment of the present disclosure, there is provided an input apparatus including an input apparatus main body, a grip detection portion, a motion detection portion, a controller, and a first response portion.

To the input apparatus main body, an input for operating an operation target is input.

The grip detection portion is configured to detect that a user has gripped the input apparatus main body with a predetermined force or more.

The motion detection portion is configured to detect a movement of the input apparatus main body and output a movement detection value corresponding to the movement of the input apparatus main body.

The controller is configured to execute, while/after the grip of the input apparatus main body is being detected by the grip detection portion, processing for controlling the operation target based on the movement detection value.

The first response portion is configured to return, when at least the grip of the input apparatus main body is detected by the grip detection portion, a first response to the user irrespective of the control of the controller.

In the input apparatus, the operation target is controlled based on the movement detection value while/after the grip of the input apparatus main body by a predetermined force or more is being detected by the grip detection portion. As a result, by holding the input apparatus with the predetermined force or more or weakening the grip force, the user can arbitrarily switch whether to reflect the operation of the input apparatus (3-dimensional operation) on the operation of the operation target.

Moreover, in the input apparatus, when the user shows an intention to start operating the operation target and holds the input apparatus main body with a predetermined force or more, the first response is returned to the user from the first response portion. Further, since the response by the first response portion is a response unrelated to the control of the controller, the first response can be returned swiftly with respect to the intention of the user to start operating the operation target.

In the input apparatus, the input apparatus main body may include a base portion and a shell-like portion.

The base portion includes a front surface.

The shell-like portion includes a front surface and an inner surface that faces the front surface of the base portion while keeping a gap and covers the front surface of the base portion.

In this case, the input apparatus may further include a switch portion provided between the front surface of the base portion and the inner surface of the shell-like portion.

In this case, the grip detection portion may be a switch mechanism that constitutes a part of the switch portion.

Also in this case, the first response portion may be a click sense generation mechanism that constitutes a part of the switch portion and generates a sense of click as the first response.

In the input apparatus, when the user holds the input apparatus main body with a predetermined force or more, the grip of the input apparatus is detected by the switch mechanism of the switch portion provided between the base portion and the shell-like portion. At this time, the sense of click is generated by the click sense generation mechanism of the switch portion. In the input apparatus, the user can easily recognize the start of the operation of the operation target by the sense of click generated by the click sense generation mechanism.

The input apparatus may further include a grip force detection portion that is provided between the front surface of the base portion and the switch portion and configured to detect a level of a grip force of the input apparatus main body and output a grip force detection value corresponding to the level of the grip force.

In the input apparatus, the input apparatus main body may further include a grip portion that is provided to cover the front surface of the shell-like portion and formed of a softer material than the base portion and the shell-like portion.

By forming the grip portion using a softer material than the base portion and the shell-like portion as described above, the user can finely adjust the level of the grip force of the input apparatus.

In the input apparatus, the first response portion may return the first response to the user when the grip of the input apparatus main body is detected by the grip detection portion and when the grip of the input apparatus is no longer detected.

With this structure, not only when the user shows an intention to start operating the operation target but also when the user shows an intention to (temporarily) stop operating the operation target and weakens the grip force of the input apparatus, the first response is returned from the first response portion. As described above, in the input apparatus, it is possible to appropriately respond to the user's intention to stop operating the operation target. In addition, the user can easily recognize that the operation of the operation target is going to be stopped by the first response.

The input apparatus may further include a second response portion configured to return a second response different from the first response to the user under control of the controller.

By the second response, various responses can be returned to the user.

The input apparatus may further include a grip force detection portion configured to detect a level of a grip force of the input apparatus main body and output a grip force detection value corresponding to the level of the grip force.

In this case, the controller may control the second response by the second response portion based on one of the movement detection value and the grip force detection value.

In the input apparatus, the second response can be appropriately returned with respect to the operation of the input apparatus (3-dimensional operation, operation based don level of grip force) made by the user.

When the input apparatus further includes a grip force detection portion configured to detect a level of a grip force of the input apparatus main body and output a grip force detection value corresponding to the level of the grip force, the controller may execute the processing for controlling the operation target based on the movement detection value and the grip force detection value while/after the grip of the input apparatus main body is being detected.

With this structure, various types of control on the operation target become possible.

In the input apparatus, the controller may execute, when the movement detection value is close to 0, processing to keep the operation target moving based on the grip force detection value.

With this structure, even when an arm is fully stretched or bent, for example, the user can arbitrarily control whether to keep the operation target moving by the level of the grip force of the input apparatus.

According to another embodiment of the present invention, there is provided an input apparatus including an input apparatus main body, a grip detection portion, a grip force detection portion, a controller, and a first response portion.

To the input apparatus main body, an input for operating an operation target is input.

The grip detection portion is configured to detect that a user has gripped the input apparatus main body with a predetermined force or more.

The grip force detection portion is configured to detect a level of a grip force of the input apparatus main body and output a grip force detection value corresponding to the level of the grip force.

The controller is configured to execute, while/after the grip of the input apparatus main body is being detected by the grip detection portion, processing for controlling the operation target based on the grip force detection value.

The first response portion is configured to return, when at least the grip of the input apparatus main body is detected by the grip detection portion, a first response to the user irrespective of the control of the controller.

In the input apparatus, the operation target is controlled based on the grip force detection value while/after the grip of the input apparatus main body with a predetermined force or more is being detected by the grip detection portion. As a result, by holding the input apparatus with the predetermined force or more or weakening the grip force, the user can arbitrarily switch whether to reflect the operation of the input apparatus (operation based on level of grip force) on the operation of the operation target.

Moreover, in the input apparatus, when the user shows an intention to start operating the operation target and holds the input apparatus main body with a predetermined force or more, the first response is returned to the user from the first response portion. Further, since the response by the first response portion is a response unrelated to the control of the controller, the first response can be returned swiftly with respect to the intention of the user to start operating the operation target.

As described above, according to the embodiments of the present disclosure, it is possible to provide an input apparatus that enables a user to arbitrarily switch whether to reflect an operation of an input apparatus on an operation of an operation target and is capable of giving a quick response to a user when the user makes an input that shows an intention to start operating an operation target to the input apparatus.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 7 is a flowchart showing an operation of the control system according to the embodiment of the present disclosure;

FIG. 11 is a flowchart showing processing of the input apparatus according to another embodiment of the present disclosure;

FIG. 12 is a diagram comparing a movement of the input apparatus in a mind of a user and an actual movement of the input apparatus at a time the user moves the input apparatus 3-dimensionally;

FIG. 13 are diagrams comparing an output waveform of an acceleration sensor in a case where the input apparatus is moved at a uniform velocity by a machine (FIG. 13A) and an output waveform of the acceleration sensor in a case where the user moves the input apparatus while trying to move the input apparatus at a uniform velocity (FIG. 13B)

DETAILED DESCRIPTION OF EMBODIMENTS

Hereinafter, embodiments of the present disclosure will be described with reference to the drawings.

First Embodiment (Overall Structure of System and Structures of Components)

Figure 1:
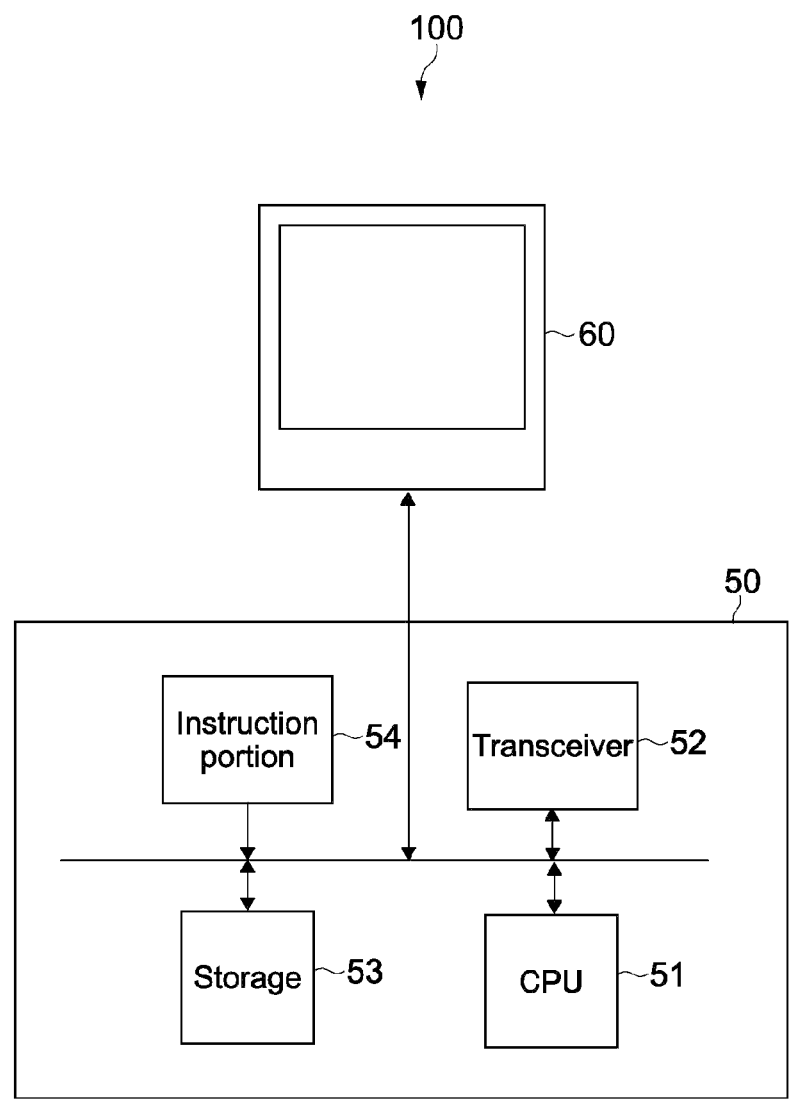
FIG. 1 is a diagram showing a control system including an input apparatus according to an embodiment of the present disclosure.

FIG. 1 is a diagram showing a control system 100 including an input apparatus 10 according to an embodiment of the present disclosure.

As shown in FIG. 1, the control system 100 includes the input apparatus 10, a control apparatus 50, and a display apparatus 60.
(Structure of Input Apparatus 10)

Figure 2:
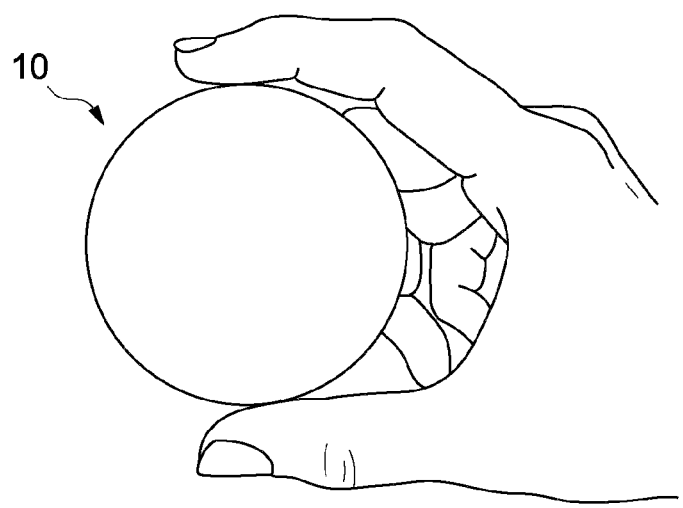
FIG. 2 is a diagram showing a state where a user is holding the input apparatus.

FIG. 2 is a diagram showing a state where a user is holding the input apparatus 10.

As shown in FIG. 2, the input apparatus 10 has a spherical shape. The input apparatus 10 is a little larger or smaller than a hardball used in baseball, and a diameter is, for example, about 50 mm to 100 mm. As a result, the input apparatus 10 is of a size that a user can handle with ease when being held. It should be noted that the diameter of the input apparatus 10 is not limited to the above range and may of course take other values.

Figure 3:
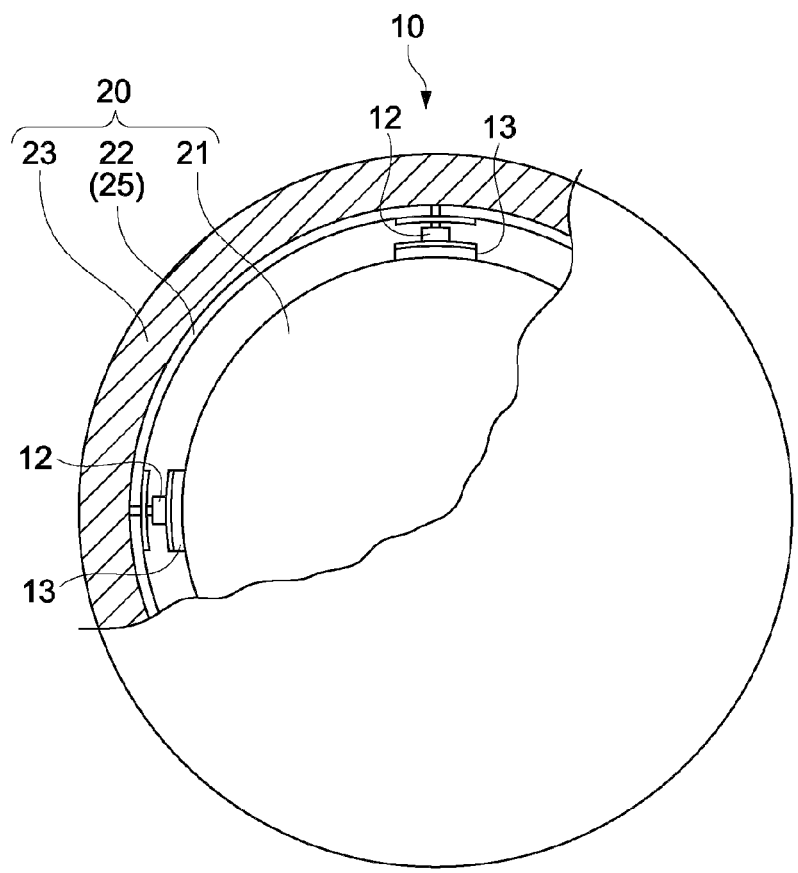
FIG. 3 is a partially-fractured diagram of the input apparatus.
Figure 4:
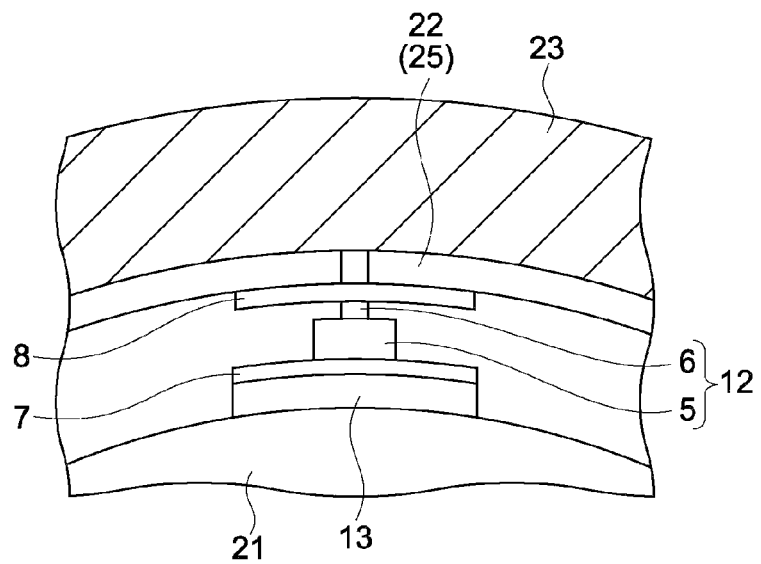
FIG. 4 is a partially-enlarged diagram of the fractured diagram shown in FIG. 3.
Figure 5A:
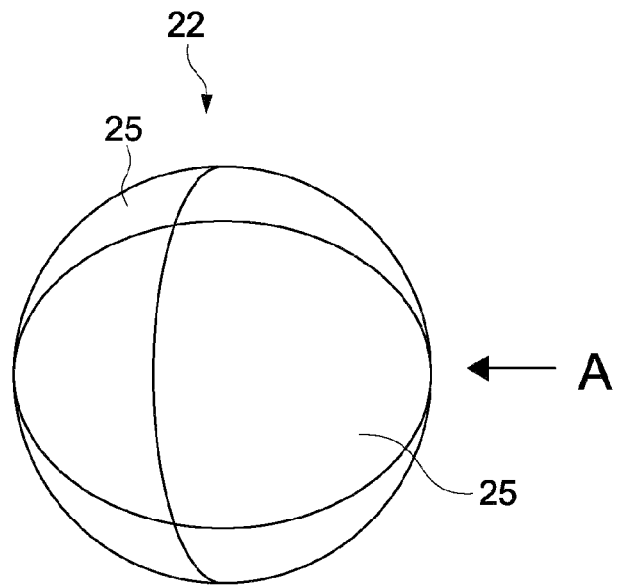
FIG. 5 are external views of a shell-like portion of the input apparatus.
Figure 5B:
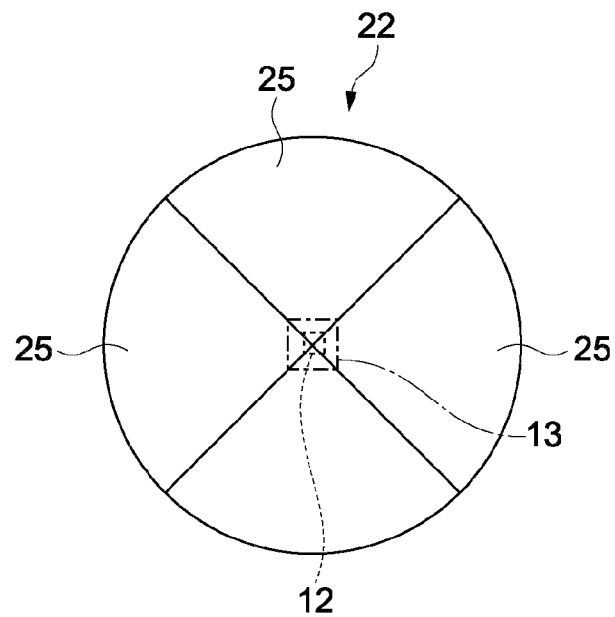

FIG. 3 is a partially-fractured diagram of the input apparatus 10, and FIG. 4 is a partially-enlarged diagram of the fractured diagram shown in FIG. 3. Further, FIG. 5 are external views of a shell-like portion 22 of the input apparatus 10. FIG. 5A shows a state where the shell-like portion 22 is viewed from an obliquely upward point, and FIG. 5B shows a state where the shell-like portion 22 is viewed in the A direction shown in FIG. 5A.

As shown in FIGS. 3 to 5, the input apparatus 10 includes a input apparatus main body 20 including a spherical base portion 21 provided at the center of the input apparatus 10, a spherical shell-like portion 22 provided so as to cover the entire front surface of the base portion 21, and a grip portion 23 provided so as to cover the entire front surface of the shell-like portion 22.

Further, the input apparatus 10 includes a tact switch 12 (switch portion) that generates a sense of click (first response) as well as detect that the input apparatus 10 has been held by a predetermined force or more. The input apparatus 10 also includes a pressure-sensitive sensor 13 (grip force detection portion) that detects a level of the grip force that the user holds the input apparatus 10 with.

The base portion 21 is hollow inside. In the hollow portion inside the base portion 21, a circuit board on which electronic components such as a CPU 11 (see FIG. 6) are mounted is provided.

Referring to FIG. 5, the shell-like portion 22 is constituted of 8 plates 25 having the same shape. The shape of each plate 25 is a shape close to an equilateral triangle. Apexes of corners of 4 adjacent plates 25 out of the 8 plates 25 concentrate at one point, and this point is formed 6 in total. The tact switch 12 and the pressure-sensitive sensor 13 are provided at positions corresponding to the 6 points. In other words, the input apparatus 10 of this embodiment includes 6 tact switches 12 and 6 pressure-sensitive sensors 13.

Referring to FIGS. 3 and 4, the tact switches 12 and the pressure-sensitive sensors 13 are provided between the front surface of the base portion 21 and an inner surface of the shell-like portion 22 (plates 25).

The pressure-sensitive sensors 13 are provided on the front surface of the base portion 21, and the tact switches 12 are provided on the pressure-sensitive sensors 13. A first pressure diffusion plate 7 is interposed between the tact switch 12 and the pressure-sensitive sensor 13, and a second pressure diffusion plate 8 is interposed between the tact switch 12 and the inner surface of the shell-like portion 22 (plates 25). By the first pressure diffusion plate 7 and the second pressure diffusion plate 8, the force with which the user holds the grip portion 23 can be uniformly transmitted to the pressure-sensitive sensors 13.

The tact switch 12 includes a switch main body 5 and a movable portion 6 that is movable with respect to the switch main body 5. The tact switch 12 also includes an electrical switch mechanism (grip detection portion) (not shown) for switching ON/OFF in accordance with the movement of the movable portion 6. The tact switch 12 also includes a click sense generation mechanism (first response portion) (not shown) that uses an elastic body such as a plate spring to generate a sense of click in accordance with the movement of the movable portion 6.

Here, a relationship between the pressure-sensitive sensor 13 and a level of a force applied to the plates 25, and the like will be described.

When calculating a level of a force applied to one plate 25 and a position at which the force is applied based on a pressure value detected by the pressure-sensitive sensor 13, at least 3 pressure-sensitive sensors 13 are necessary with respect to one plate 25.

In this embodiment, 3 pressure-sensitive sensors 13 (used in common with other plate 25) that detect a force applied to the plate 25 are provided with respect to one plate 25. Therefore, by executing an operation that uses a vector calculation or the like based on the pressure value from the pressure-sensitive sensors 13, the level of the force applied to the plate 25 and the position at which the force is applied can be calculated accurately.

Moreover, when using 3 pressure-sensitive sensors 13 for each of the 8 plates 25, 8*3=24 pressure-sensitive sensors 13 become necessary. In this embodiment, however, each of the pressure-sensitive sensors 13 is arranged at a point at which the apexes of the corners of the 4 adjacent plates 25 concentrate, and one pressure-sensitive sensor 13 is commonly used by 4 adjacent plates 25. As a result, the number of pressure-sensitive sensors is suppressed to a total of 6, thus realizing a reduction in costs of the input apparatus 10.

As described above, in this embodiment, the level of the force applied to the plates 25 and the position at which the force is applied can be calculated accurately with the least necessary number of pressure-sensitive sensors 13.

However, the pressure-sensitive sensors 13 do not always need to be structured as described above.

For example, the number of pressure-sensitive sensors may be 1 or 2 with respect to a single plate 25, or the number may be 4 or more. In addition, instead of being commonly used with other plates 25, the pressure-sensitive sensors 13 may be provided independently with respect to each plate 25.

Typically, the pressure-sensitive sensors 13 may take any form as long as the user is capable of detecting the force applied to the plates 25 (shell-like portion 22) when the user holds the input apparatus 10. The number of plates 25 (divisional number of shell-like portion 22) is also not limited to 8. For example, the number of plates 25 may be 2, 4, or the like.

The base portion 21 and the shell-like portion 22 are formed of, for example, metal or a resin. On the other hand, the grip portion 23 is formed of a softer material than the base portion 21 and the shell-like portion 22. As the material used for the grip portion 23, there is, for example, a sponge formed by foaming a synthetic resin such as polyurethane.

By using a sponge as the material for the grip portion 23, it is possible to improve a tactile impression and the user is enabled to finely adjust a level of the grip force of the input apparatus 10.

Figure 6:
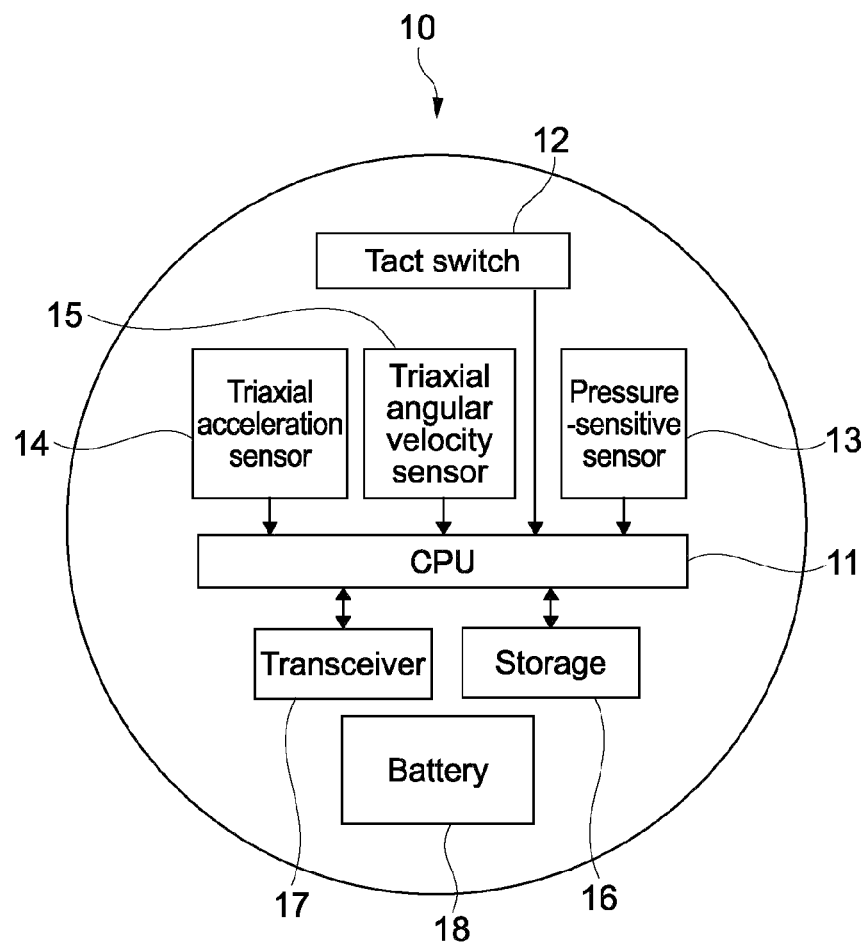
FIG. 6 is a block diagram showing an electrical structure of the input apparatus.

FIG. 6 is a block diagram showing an electrical structure of the input apparatus 10.

As shown in FIG. 6, the input apparatus 10 includes, in addition to the tact switch 12 and the pressure-sensitive sensor 13, a CPU 11, a triaxial acceleration sensor 14, a triaxial angular velocity sensor 15, a storage 16, a transceiver 17, and a battery 18.

The triaxial acceleration sensor 14, the triaxial angular velocity sensor 15, the CPU 11, the transceiver 17, and the storage 16 are mounted on a circuit board (not shown). The circuit board on which electronic components such as the CPU 11 are mounted and the battery 18 are provided in the hollow portion formed inside the base portion 21.

The triaxial acceleration sensor 14 and the triaxial angular velocity sensor 15 (motion detection portion) are sensors that detect 3-dimensional movements of the input apparatus 10. The triaxial acceleration sensor 14 detects accelerations in triaxial directions orthogonal to one another and outputs acceleration values (movement detection values) corresponding to the detected accelerations to the CPU 11. The triaxial angular velocity sensor 15 detects angular velocities about the triaxial directions orthogonal to one another and outputs angular velocity values (movement detection values) corresponding to the detected angular velocities to the CPU 11.

The storage 16 includes a nonvolatile memory such as a ROM (Read Only Memory) that stores various programs requisite for processing of the CPU 11 and a volatile memory such as a RAM (Random Access Memory) that is used as a working area of the CPU 11.

The tact switch 12 outputs a signal to the CPU 11 when the switch mechanism is in an ON state.

The pressure-sensitive sensor 13 outputs a pressure value corresponding to the level of the grip force that the user holds the input apparatus 10 with to the CPU 11.

The CPU 11 (controller) executes various operations based on the angular velocity values, the acceleration values, and the pressure values output from the triaxial acceleration sensor 14, the triaxial angular velocity sensor 15, and the pressure-sensitive sensor 13 to control the operation target. For example, the CPU 11 calculates a 3-dimensional movement amount, rotation amount, and the like of the input apparatus 10 based on the acceleration values and the angular velocity values. The CPU 11 also calculates the level of the grip force of the input apparatus 10, the position at which the force is applied, and the like based on the pressure value output from the pressure-sensitive sensor 13.

It should be noted that the CPU 11 executes the various operations while/after the signal from the switch mechanism is being input from the tact switch 12. The processing of the CPU 11 will be described later.

The transceiver 17 includes an antenna and transmits various types of information to the control apparatus 50 under control of the CPU 11. For example, the transceiver 17 transmits information on the 3-dimensional movement amount and rotation amount of the input apparatus 10 and information on the level of the grip force and the position at which the force is applied to the control apparatus 50. It should be noted that the transceiver 17 is also capable of receiving information transmitted from the control apparatus 50.

As the battery 18, a rechargeable battery is used, for example.

(Control Apparatus 50 and Display Apparatus 60)

Referring again to FIG. 1, the control apparatus 50 includes a CPU 51, a storage 53, a transceiver 52, and an instruction portion 54.

The control apparatus 50 may be an apparatus dedicated to the input apparatus 10 or may be a PC or the like.

The transceiver 52 includes an antenna and receives various types of information transmitted from the input apparatus 10. The transceiver 52 is also capable of transmitting a signal to the input apparatus 10.

The storage 53 includes a nonvolatile memory such as a ROM that stores various programs requisite for control of the CPU 51 and a volatile memory such as a RAM that is used as a working area of the CPU 51.

The instruction portion 54 is, for example, a keyboard, and the user sets initial settings, special settings, and the like via the instruction portion 54. The instruction portion 54 receives various instructions from the user and outputs input signals to the CPU 51.

The CPU 51 controls the operation target displayed on the display apparatus 60 based on various types of information received by the transceiver 17.

The display apparatus 60 is constituted of, for example, a liquid crystal display or an EL (Electro-Luminescence) display. The display apparatus 60 may display a 2D image or a 3D image. The display apparatus 60 2- or 3-dimensionally displays the operation target that is operated by the input apparatus 10.

As the operation target that is displayed 2-dimensionally, there is a GUI such as a pointer, an icon, and a window. As the operation target that is displayed 3-dimensionally, there are human- and animal-form character images that are displayed 3-dimensionally. It should be noted that the examples are mere examples, and the operation target may be any image as long as it is an image that is displayed 2- or 3-dimensionally.

The display apparatus 60 may be a television apparatus that is capable of receiving television broadcast and the like. Alternatively, when the display apparatus 60 displays the operation target 3-dimensionally, the display apparatus 60 may be a 3D image display apparatus that displays a 3D image that the user is capable of visually recognizing with the naked eye. Although FIG. 1 separately shows the control apparatus 50 and the display apparatus 60, the control apparatus 50 and the display apparatus 60 may be integrated.

(Description on Operations)

Next, an operation of the control system 100 according to this embodiment will be described.

FIG. 7 is a flowchart showing the operation of the control system 100 according to this embodiment.

First, the user raises the input apparatus 10 and moves it to a position where the user can operate it with ease. It should be noted that at this time, the operation target displayed on the display portion does not move (see NO in Step 101). The user shows an intention to start operating the input apparatus 10 and holds the grip portion 23 of the input apparatus main body 20 with a predetermined force or more. As a result, the shell-like portion 22 (plates 25) of the input apparatus main body 20 and the movable portion 6 of the tact switch 12 are moved in a direction that approaches the center of the input apparatus 10. When the movable portion 6 of the tact switch 12 moves in the direction that approaches the center of the input apparatus 10, a sense of click is generated by the click sense generation mechanism.

By a response using the sense of click (first response), the input apparatus 10 can appropriately respond to the intention of the user to start operating the operation target. As a result, by the sense of click, the user can easily recognize that the operation of the operation target is to be started. Further, since the response using the sense of click generated by the click sense generation mechanism is a response made without the control of the controller, the response by the sense of click can be swiftly returned to the user.

When the movable portion 6 of the tact switch 12 moves in the direction that approaches the center of the input apparatus 10, the sense of click is generated, and the switch mechanism of the tact switch 12 is turned on. As a result, a signal is input from the switch mechanism to the CPU 11 (YES in Step 101).

When input with the signal from the tact switch 12, the CPU 11 acquires acceleration values and angular velocity values from the triaxial acceleration sensor 14 and the triaxial angular velocity sensor 15 and acquires a pressure value from the pressure-sensitive sensor 13 (Step 102).

Next, based on the acceleration values and angular velocity values, the CPU 11 executes an operation to calculate a movement amount and rotation amount of the input apparatus 10 (per predetermined time) (Step 103). The CPU 11 also calculates a level of a grip force that the input apparatus 10 is held with (level of force applied to plates 25) and a position at which the force is applied by executing an operation that uses a vector calculation and the like based on the pressure value.

Next, the CPU 11 transmits the calculated information (movement amount and rotation amount of input apparatus 10, level of grip force that input apparatus 10 is held with, and position at which force is applied) to the control apparatus 50 via the transceiver 17 (Step 104).

The CPU 51 of the control apparatus 50 judges whether the pieces of information have been received from the input apparatus 10 (Step 201). When judged that the pieces of information have been received from the input apparatus 10, the CPU 51 of the control apparatus 50 controls the operation target based on the received pieces of information (Step 202).

It should be noted that the CPU 51 of the control apparatus 50 may additionally execute an operation for the received pieces of information and execute processing for improving accuracy of control of the operation target in Step 202.

For example, when the operation target is a character image that is displayed 3-dimensionally, the CPU 11 executes processing of 3-dimensionally moving or turning the character image based on the information on the movement amount and rotation amount of the input apparatus 10 in Step 202. The CPU 11 also executes processing to make the character image take a specific movement (e.g., jump, squat, laugh, and get angry) in accordance with the information on the level of the grip force and the information on the position at which the force is applied. It should be noted that the control of the operation target based on the information on the movement amount, rotation amount, level of the grip force, and position at which the force is applied is not particularly limited.

By the processing shown in FIG. 7, the user can move or turn the input apparatus 10 while/after holding the input apparatus 10 with the predetermined force or more or make the operation target make an arbitrary movement by holding the input apparatus 10 more strongly or strongly pressing a specific position of the input apparatus 10.

On the other hand, when (temporarily) stopping the operation of the operation target, the user weakens the grip force of the input apparatus 10. When the user weakens the grip force of the input apparatus 10 and the grip force falls below the predetermined force, the movable portion 6 of the tact switch 12 and the shell-like portion 22 (plates 25) of the input apparatus main body 20 move in a direction that moves away from the center of the input apparatus 10.

As the movable portion 6 of the tact switch 12 moves in the direction that moves away from the center of the input apparatus 10, a sense of click is generated by the click sense generation mechanism.

By a response using the sense of click, the input apparatus 10 can appropriately respond to the intention of the user to stop operating the operation target. As a result, by the sense of click, the user can easily recognize that the operation of the operation target is to be stopped.

When the movable portion 6 of the tact switch 12 moves in the direction that moves away from the center of the input apparatus 10, the sense of click is generated, and an output of the signal from the switch mechanism of the tact switch 12 is stopped. As a result, the input of the signal from the tact switch 12 to the CPU 11 is stopped (NO in Step 101), and the movement of the operation target is stopped.

As described above, in this embodiment, by holding the input apparatus 10 with the predetermined force or more or weakening the grip force that the input apparatus 10 is held with, the user can arbitrarily switch whether to reflect the operation of the input apparatus 10 (3-dimensional movement and operation based on level of grip force) on the operation of the operation target.

Further, in the input apparatus 10 of this embodiment, it is possible to appropriately respond to the intention of the user to start operating the operation target by the click sense generation mechanism of the tact switch 12. As a result, the user can easily recognize that the operation of the operation target is to be started by the sense of click. Moreover, since the response that uses the sense of click generated by the click sense generation mechanism is a response that is made without the control of the CPU 11, a response that uses the sense of click can be swiftly returned to the user.

Furthermore, in this embodiment, by the response that uses the sense of click, it is possible to swiftly respond to the intention of the user to stop operating the operation target. As a result, by the sense of click, the user can easily recognize that the operation of the operation target is to be stopped.

Second Embodiment

Next, a second embodiment of the present disclosure will be described. It should be noted that in the descriptions on the second embodiment and subsequent embodiments, components having the same structures and functions as those of the first embodiment are denoted by the same reference numerals, and descriptions thereof will be omitted or simplified.
(Structure of Input Apparatus 10)

Figure 8:
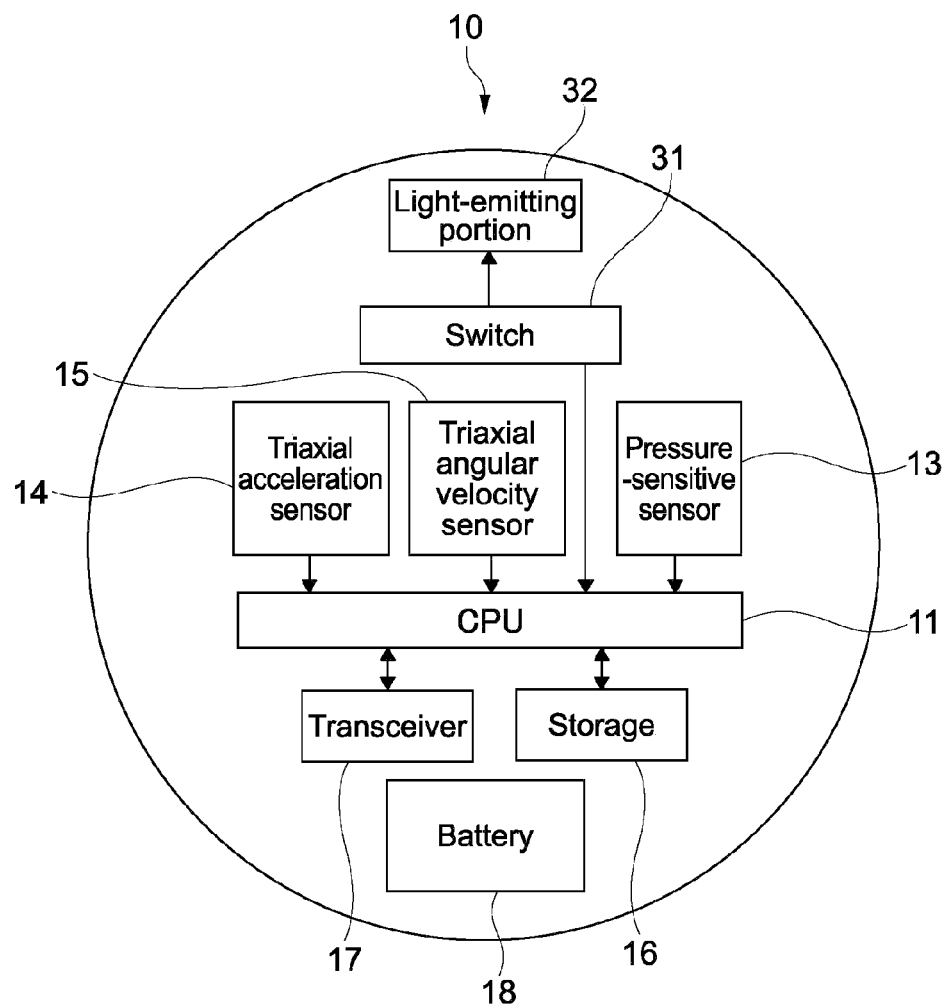
FIG. 8 is a block diagram showing an electrical structure of the input apparatus according to another embodiment of the present disclosure.

FIG. 8 is a block diagram showing an electrical structure of the input apparatus 10 according to the second embodiment.

As shown in FIG. 8, the second embodiment is different from the first embodiment (see FIG. 6) above in that a switch 31 is provided in place of the tact switch 12 and a light-emitting portion 32 electrically connected to the switch 31 is provided.

Although the switch 31 differs from the tact switch 12 in that the switch 31 is not provided with the click sense generation mechanism inside, other structures are the same as those of the tact switch 12. Specifically, the switch 31 includes a switch main body 5, a movable portion 6 that is movable with respect to the switch main body 5, and an electrical switch mechanism (grip detection portion) (not shown) that switches ON/OFF according to a movement of the movable portion 6.

The light-emitting portion 32 is constituted of, for example, a light bulb or an LED (Light Emitting Diode). The light-emitting portion 32 emits light or turns off the light in accordance with the ON/OFF switch of the switch mechanism of the switch 31. The light-emitting portion 32 is provided in the hollow portion formed inside the base portion 21.

It should be noted that in the second embodiment, the base portion 21, the shell-like portion 22, and the grip portion 23 are formed of a transparent or translucent material.

(Descriptions on Operation)

When the user shows an intention to start operating the input apparatus 10 and holds the grip portion 23 of the input apparatus main body 20 with a predetermined force or more, the movable portion 6 of the switch 31 moves in the direction that approaches the center of the input apparatus 10. When the movable portion 6 of the switch 31 moves in the direction that approaches the center of the input apparatus 10, the switch mechanism of the switch 31 is put to an ON state, and the light-emitting portion 32 emits light.

In the second embodiment, by a response that uses light emission of the light-emitting portion 32 (first response), it is possible to appropriately respond to the intention of the user to start operating the operation target. Further, in the second embodiment, since the response that uses light emission of the light-emitting portion 32 is a response that is made without the control of the controller as in the first embodiment, a quick response can be returned to the user.

When the switch mechanism of the switch 31 is put to the ON state, a signal is input to the CPU 11. When input with the signal, the CPU 11 executes various operations based on detection values of the various sensors and transmits the operation results to the control apparatus 50. As a result, the movement of the operation target is controlled by the user operating the input apparatus 10 (3-dimensional operation and operation based on level of grip force of input apparatus 10) while/after holding it with the predetermined force or more.

It should be noted that while/after the input apparatus 10 is held with the predetermined force or more, the light-emitting portion 32 continues emitting light.

On the other hand, when the user weakens the grip force of the input apparatus 10 and the grip force falls below the predetermined force, the movable portion 6 of the switch 31 moves in the direction that moves away from the center of the input apparatus 10. As a result, the switch mechanism of the switch 31 is put to an OFF state, and the light of the light-emitting portion 32 is turned off. The user can easily recognize that the operation of the operation target is stopped by the turn-off of the light of the light-emitting portion 32.

(Modified Example of Second Embodiment)

The descriptions above have been given on the case where the light-emitting portion 32 that emits light in accordance with the switch of the switch mechanism is used. However, a sound (voice) generation portion that generates a sound (voice) or a vibration portion that generates a vibration in accordance with the switch of the switch mechanism may be used instead of the light-emitting portion 32. Alternatively, a combination of those or a combination of those with the tact switch 12 (click sense generation mechanism) may be used.

Third Embodiment

Next, a third embodiment of the present disclosure will be described.

The above embodiments have described the case where a response using a sense of click or the like is returned from the input apparatus 10 when the user shows an intention to start or stop operating the operation target and holds the input apparatus 10 with a predetermined force or more or weakens the grip force.

The third embodiment is different from the above embodiments in that, in addition to the response that uses a sense of click or the like, a response different from the response that uses a sense of click or the like is returned from the input apparatus 10 when the user operates the input apparatus 10 3-dimensionally. Therefore, that point will mainly be described.

It should be noted that in the descriptions in the specification, the response that uses, for example, a sense of click that is generated by the input apparatus 10, that is a response to the intention of the user to start (and stop) operating the operation target, at the time the user holds the input apparatus 10 with a predetermined force or more (or weakens grip force) is referred to as first response. On the other hand, a response that is generated from the input apparatus 10 when the user operates the input apparatus 10 3-dimensionally or the like is referred to as second response.

Further, a member that generates the first response irrespective of the control of the CPU 11 is referred to as first response portion, and a member that generates the second response under control of the CPU 11 is referred to as second response portion.

(Structure of Input Apparatus 10)

Figure 9:
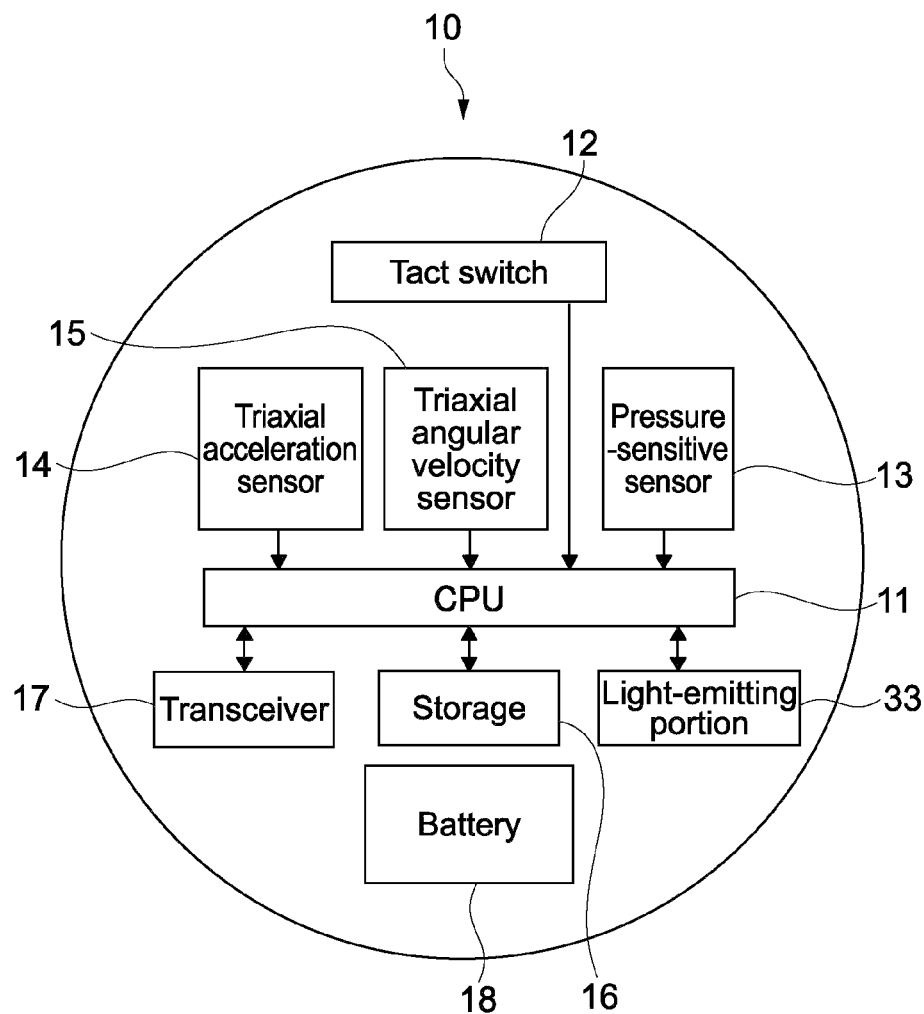
FIG. 9 is a block diagram showing an electrical structure of the input apparatus according to another embodiment of the present disclosure.

FIG. 9 is a block diagram showing an electrical structure of the input apparatus 10 according to a third embodiment.

As shown in FIG. 9, although a light-emitting portion 33 electrically connected to the CPU 11 is provided in the third embodiment, other structures are the same as those of the first embodiment above (see FIG. 6).

The light-emitting portion 33 (second response portion) is constituted of, for example, a light bulb or an LED (Light Emitting Diode). The light-emitting portion 33 is a member that returns an optical response to the user as a response different from a sense of click under control of the CPU 11. For example, the light-emitting portion 33 emits light (monochrome, multicolor) or flickers (monochrome, multicolor) under control of the CPU 11. The light-emitting portion 33 is provided in the hollow portion formed inside the base portion 21.

It should be noted that in the third embodiment, the base portion 21, the shell-like portion 22, and the grip portion 23 are formed of a transparent or translucent material.

(Descriptions on Operations)

When the user holds the input apparatus 10 with a predetermined force or more, a sense of click is generated by the click sense generation mechanism of the tact switch 12, and the switch mechanism of the tact switch 12 is put to an ON state. When the switch mechanism of the tact switch 12 is put to the ON state, a signal is input to the CPU 11.

When input with the signal from the switch mechanism, the CPU 11 acquires acceleration values, angular velocity values, and pressure values from the sensors to calculate a movement amount and rotation amount of the input apparatus 10, a level of the grip force of the input apparatus 10, a position at which the force is applied, and the like. Then, the operation result is transmitted to the control apparatus 50.

Further, the CPU 11 causes the light-emitting portion 33 to emit light (monochrome, multicolor) or flicker (monochrome, multicolor) based on the operation result. For example, the CPU 11 causes the light-emitting portion 33 to emit light (monochrome, multicolor) or flicker (monochrome, multicolor) when the movement amount or rotation amount of the input apparatus 10 is larger than a predetermined value. The CPU 11 also causes the light-emitting portion 33 to emit light (monochrome, multicolor) or flicker (monochrome, multicolor) when the level of the grip force with which the input apparatus 10 is held is larger than a predetermined value or the position at which the force is applied is a certain position, for example.

It should be noted that regarding the light emission and flickering of the light-emitting portion 33 based on the movement amount and rotation amount of the input apparatus 10, the level of the grip force, and the position of the force, emission colors, flickering patterns, and the like may be differentiated so that the user does not get mixed up.

Alternatively, the CPU 11 may execute processing to cause the light-emitting portion 33 to emit light stepwise by different emission colors and flickering patterns based on the movement amount and rotation amount of the input apparatus 10 and the level of the grip force. Alternatively, the CPU 11 may execute processing to cause the light-emitting portion 33 to emit light by different emission colors or different flickering patterns based on the position at which the force is applied.

By the processing as described above, the input apparatus 10 can appropriately return an optical response (second response) with respect to the user's operation to the input apparatus 10 (3-dimensional operation, operation based on level of grip force).

Further, since the second response (light) is a response different from the first response (sense of click) in the input apparatus 10 of the third embodiment, it is possible to prevent the user from getting mixed up.

(Modified Example of Third Embodiment)

In the descriptions above, the light-emitting portion 33 that emits light has been taken as an example of the second response portion that generates the second response under control of the CPU 11. However, the second response portion is not limited to the light-emitting portion 33. Other examples of the light-emitting portion 33 include a sound (voice) generation portion that generates a sound (voice), a vibration portion that generates a vibration, and a heat radiation portion that radiates heat under control of the CPU 11. Alternatively, as the second response portion, a pseudo acceleration generation portion that generates a pseudo acceleration under control of the controller may be used, for example. Alternatively, the second response portion may be a combination of those.

In the third embodiment, the tact switch 12 (click sense generation mechanism) has been taken as an example of the first response portion. However, the first response portion may be the light-emitting portion 32 described in the second embodiment, a sound (voice) generation portion, a vibration portion, or the like. Alternatively, the first response portion may be a combination of those.

A combination of the first response portion and the second response portion may be any combination as long as the first response and the second response differ. It should be noted that a combination in which the first response portion is the vibration portion and the second response portion is also the vibration portion is also possible. In this case, the vibration patterns of the first response portion and the second response portion only need to be differentiated.

It should be noted that the second response may be the same as that of the movement of the operation target. For example, processing that causes the vibration portion to vibrate may be executed when the operation target is vibrated.

Fourth Embodiment

Next, a fourth embodiment of the present disclosure will be described.

Here, a case where the operation target that is displayed 3-dimensionally by the display apparatus 60 is enlarged and contracted at a time the input apparatus 10 is moved backwardly and forwardly while/after the user is holding the input apparatus 10 with the predetermined force or more will be described.

In this case, when an arm of the user is fully stretched or fully contracted, the user cannot enlarge or contract the operation target.

In this regard, in the input apparatus 10 of the fourth embodiment, even when the input apparatus 10 is hardly moving, when the input apparatus 10 is held with a certain level of force, processing of continuing the movement (enlargement, contraction) of the operation target is executed.

Figure 10:
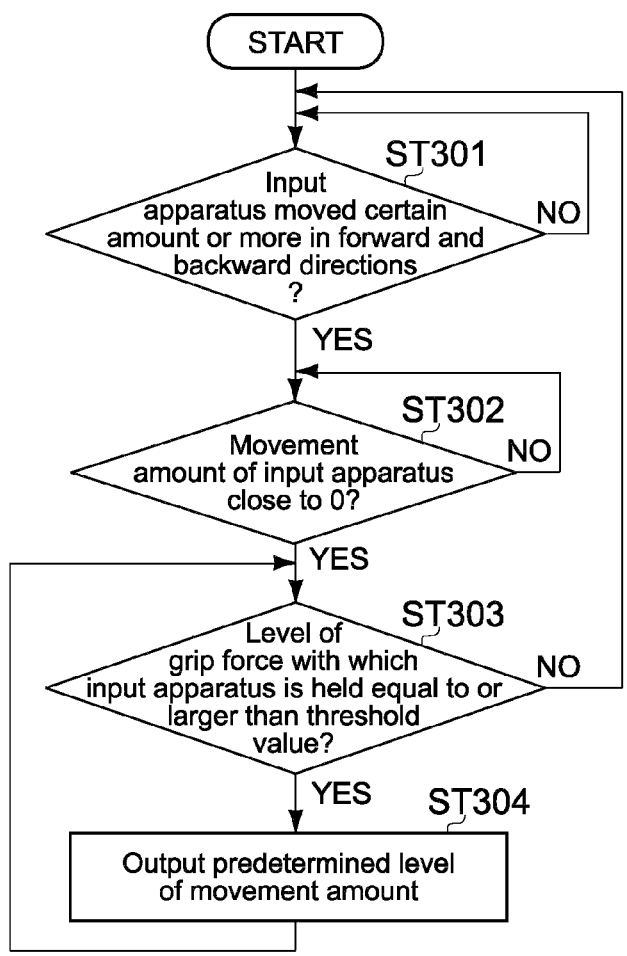
FIG. 10 is a flowchart showing processing of the input apparatus according to another embodiment of the present disclosure.

FIG. 10 is a flowchart showing processing of the input apparatus according to the fourth embodiment.

The CPU 11 of the input apparatus 10 judges whether the input apparatus 10 has moved a certain amount or more in a forward or backward direction (depth direction and front direction from user) (Step 301).

When the input apparatus 10 has moved a certain amount or more in the forward or backward direction (YES in Step 301), the CPU 11 next judges whether the movement amount of the input apparatus 10 is close to 0 (Step 302).

When the movement amount of the input apparatus 10 is close to 0 (YES in Step 302), the CPU 11 judges whether a level of the force with which the input apparatus 10 is held is equal to or larger than a threshold value (Step 303). When the level of the grip force is equal to or larger than the threshold value (YES in Step 303), the CPU 11 of the input apparatus 10 outputs information on a predetermined level of a movement amount to the control apparatus 50 via the transceiver 17 (Step 304).

Specifically, even when the input apparatus 10 is hardly moving, the CPU 11 of the input apparatus 10 transmits the information on a predetermined level of a movement amount to the control apparatus 50 assuming that the input apparatus 10 is moving, when the input apparatus 10 is held strongly. It should be noted that when the input apparatus 10 is moved forwardly and backwardly, the information on the movement amount is of course transmitted to the control apparatus 50 from the input apparatus 10.

Upon receiving the information on the movement amount, the CPU 51 of the control apparatus 50 executes, based on the information on the movement amount, processing for enlarging and contracting the operation target that is displayed 3-dimensionally, for example.

By the processing shown in FIG. 10, even when the arm of the user is fully stretched or contracted, the user can continue to enlarge or contract the operation target by strongly holding the input apparatus 10. It should be noted that when stopping the enlargement and contraction of the operation target, the user only needs to weaken the grip force of the input apparatus 10.

In the example above, the descriptions have been given on the case where the operation target is enlarged and contracted based on the movement of the input apparatus 10 in the front and backward directions. However, the movement direction of the input apparatus 10 may be a vertical direction or a lateral direction and is not particularly limited. Moreover, although the case where the operation target is enlarged and contracted based on the movement of the input apparatus 10 has been described in the example above, the operation target may be enlarged and contracted based on the rotation of the input apparatus 10. The rotational direction of the input apparatus 10 is also not particularly limited. The same holds true for a fifth embodiment to be described later.

The above descriptions have been given on the enlargement and contraction of the operation target, though not limited thereto. The processing described in the fourth embodiment is also applicable to 2- and 3-dimensional movements of the operation target, for example, and is also applicable to scroll when the operation target is a window displayed on a screen. The same holds true for the fifth embodiment to be described later.

Fifth Embodiment

The fourth embodiment above has described the case where the movement of the operation target is continued by strengthening the grip force of the input apparatus 10.

In the fifth embodiment, however, the movement of the operation target is continued by weakening the grip force of the input apparatus 10.

It should be noted that in the fifth embodiment, a case where the operation target that is displayed 3-dimensionally is enlarged and contracted at a time the input apparatus 10 is moved backwardly and forwardly while/after the user is holding the input apparatus 10 with the predetermined force or more will be described as in the fourth embodiment.

FIG. 11 is a flowchart showing processing of the input apparatus 10 according to the fifth embodiment.

The CPU 11 of the input apparatus 10 judges whether the input apparatus 10 has moved a certain amount or more in the front or backward direction (depth direction and front direction from user) (Step 401).

When the input apparatus 10 has moved a certain amount or more in the forward or backward direction (YES in Step 401), the CPU 11 next judges whether the movement amount of the input apparatus 10 is close to 0 (Step 402).

When the movement amount of the input apparatus 10 is close to 0 (YES in Step 402), the CPU 11 judges whether a level of the force with which the input apparatus 10 is held is equal to or smaller than a threshold value (Step 403). When the level of the grip force is equal to or smaller than the threshold value (YES in Step 403), the CPU 11 of the input apparatus 10 outputs information on a predetermined level of a movement amount to the control apparatus 50 via the transceiver 17 (Step 404).

Specifically, unlike in the fourth embodiment, when the grip force of the input apparatus 10 is small (larger than force with which sense of click or the like is generated), the CPU 11 of the input apparatus 10 according to the fifth embodiment transmits the information on a predetermined level of a movement amount to the control apparatus 50 assuming that the input apparatus 10 is moving. It should be noted that when the input apparatus 10 is moved forwardly and backwardly, the information on the movement amount is of course transmitted to the control apparatus 50 from the input apparatus 10.

By the processing shown in FIG. 11, even when the arm of the user is fully stretched or contracted, the user can continue to enlarge or contract the operation target by weakening the grip force of the input apparatus 10. It should be noted that when stopping the enlargement and contraction of the operation target, the user only needs to strengthen the grip force of the input apparatus 10.

Sixth Embodiment

Next, a sixth embodiment of the present disclosure will be described.

It should be noted that in the sixth embodiment, a correction with respect to the 3-dimensional operation of the input apparatus 10 made by the user will be described.
(Correction of Curved Movement of Input Apparatus 10 into Linear Movement)

FIG. 12 is a diagram comparing a movement of the input apparatus 10 in a mind of a user and an actual movement of the input apparatus 10 at a time the user moves the input apparatus 10 3-dimensionally.

As shown in FIG. 12, in a case where the user holds and moves the input apparatus 10, even when the user is intending to linearly move the input apparatus 10, the input apparatus 10 is not actually moved linearly in many cases. In this case, the input apparatus 10 is actually being rotated while moving curvedly, with the result that an error is caused by the rotation.

In this regard, the CPU 11 of the input apparatus 10 may use, when calculating the movement amount of the input apparatus 10 based on the output from the acceleration sensor 14 (acceleration values), an output from the angular velocity sensor 15 (angular velocity values) to execute processing of correcting the movement amount. Specifically, the CPU 11 of the input apparatus 10 uses the output of the angular velocity sensor 15 to correct the curved movement amount of the input apparatus 10 into a linear movement amount at the time of calculating the movement amount.

It should be noted that since the rotation of the input apparatus 10 is a minute rotation in many cases, the correction takes such a minute rotation into consideration.

By the correction, it becomes possible to correct the movement of the input apparatus 10 so that it becomes close to the movement of the input apparatus 10 in a mind of the user. Therefore, the movement of the operation target can be made closer to the movement in the mind of the user. As a result, the user can favorably operate the operation target using the input apparatus 10.
(Correction to Make Velocity Constant)

In a case where the user holds and moves the input apparatus 10, even when the user is intending to move the input apparatus 10 at a uniform velocity, the input apparatus 10 is not actually moved at a uniform velocity in many cases.

FIG. 13 are diagrams comparing an output waveform of the acceleration sensor 14 in a case where the input apparatus 10 is moved at a uniform velocity by a machine (FIG. 13A) and an output waveform of the acceleration sensor 14 in a case where the user moves the input apparatus 10 while trying to move the input apparatus 10 at a uniform velocity (FIG. 13B).

As shown in FIG. 13A, when the input apparatus 10 is moved by a machine, the input apparatus 10 is accelerated rapidly to start moving and reaches a uniform velocity state in a short time. After that, the input apparatus 10 is decelerated rapidly and stopped. On the other hand, as shown in FIG. 13B, when the input apparatus 10 is moved by the user, the input apparatus 10 is gradually accelerated to start moving and gradually decelerated to stop. Moreover, as shown in FIG. 13B, even when the user is intending to move the input apparatus 10 at a uniform velocity, the input apparatus 10 is not moved at a uniform velocity.

In this regard, the CPU 11 of the input apparatus 10 may correct the output of the acceleration sensor 14 to correct the velocity (movement amount) of the input apparatus 10 to be constant.

As a result, since it becomes possible to correct the velocity (movement amount) of the input apparatus 10 to come close to the velocity of the input apparatus 10 in the mind of the user, the user can favorably operate the operation target using the input apparatus 10.

(Correction to Make Angular Velocity Constant)

Figure 14:
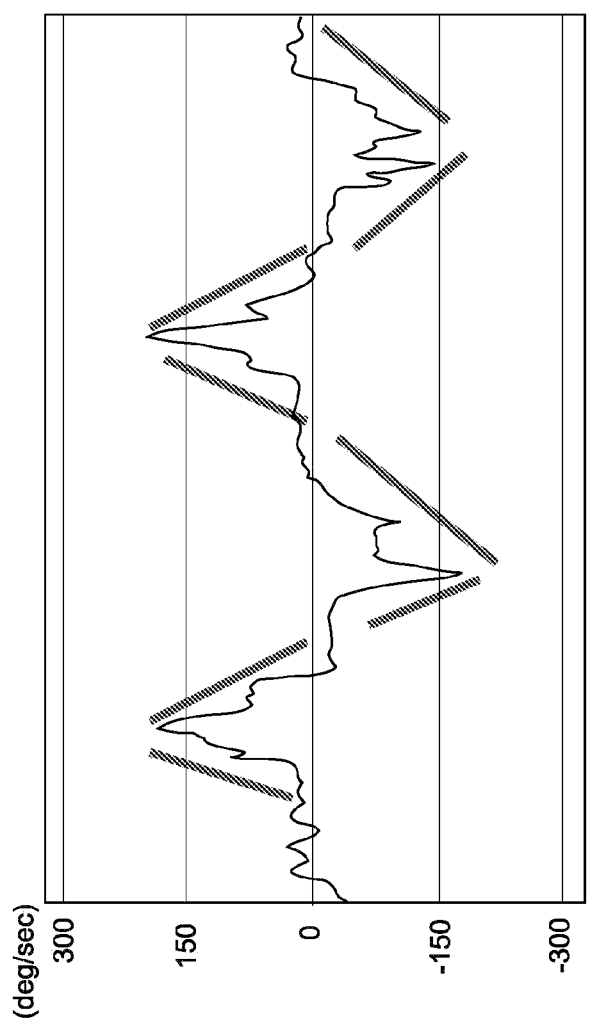
FIG. 14 is a diagram showing an output waveform of an angular velocity sensor in a case where the user turns the input apparatus while trying to turn the input apparatus at a uniform angular velocity.

FIG. 14 is a diagram showing an output waveform of the angular velocity sensor 15 in a case where the user turns the input apparatus 10 while trying to turn the input apparatus 10 at a uniform angular velocity.

In a case where the user holds and turns the input apparatus 10, even when the user is intending to turn the input apparatus 10 at a uniform angular velocity, the input apparatus 10 is not actually moved at a uniform angular velocity in many cases.

In this regard, the CPU 11 of the input apparatus 10 may correct the output of the angular velocity sensor 15 to correct the angular velocity (rotation amount) of the input apparatus 10 to be constant.

As a result, since it becomes possible to correct the angular velocity (rotation amount) of the input apparatus 10 to come close to the angular velocity of the input apparatus 10 in the mind of the user, the user can favorably operate the operation target using the input apparatus 10.

Modified Examples

For example, it is also possible to use the input apparatus 10 and make the same input as an arrow key as that provided on a remote controller of a television apparatus. In this case, processing corresponding to a press of up-, down-, left-, and right-keys of the arrow key may be executed when the user turns the input apparatus 10 in vertical and lateral directions.

Further, processing corresponding to a continuous press of the up-, down-, left-, and right-keys of the arrow key may be executed when the user moves the input apparatus 10 in the vertical and lateral directions while/after strongly holding the input apparatus 10. Alternatively, when the user moves the input apparatus 10 in the vertical and lateral directions, weakens the grip force after that, and holds the input apparatus 10 again, processing corresponding to a continuous press of the up-, down-, left-, and right-keys of the arrow key may be executed. It should be noted that in this case, a sense of click is generated at the time the grip force of the input apparatus 10 is weakened, and a sense of click is also generated at the time the input apparatus 10 is held again.

Although the descriptions above have been given on the case where the input apparatus 10 is wireless, the input apparatus 10 may be wired instead.

Although the base portion 21, the shell-like portion 22, and the grip portion 23 have been spherical in the descriptions above, those members may take a polygonal shape.

Although the pressure-sensitive sensor 13 has been taken as an example in the descriptions above, a static sensor may be used in place of the pressure-sensitive sensor 13.

The static sensor is structured to be capable of reading a change of capacitance according to a distance, for example. The static sensor is capable of detecting a level of a grip force of the input apparatus 10 by detecting a hand proximity amount acquired at a time the user holds the input apparatus 10. The static sensor is, for example, spherical or polygonal.

The static sensor is structured to not come into contact with the grip portion 23. With this structure, degradation due to, for example, abrasion caused by a manual operation can be prevented from occurring.

It should be noted that both the pressure-sensitive sensor 13 and the static sensor may be used. In this case, for example, by detecting an additionally-minute force that cannot be detected by the pressure-sensitive sensor 13 using the static sensor, a sensor structure having higher sensitivity (wide detection range) is realized.

The input apparatus 10 may be equipped with an electric power generation device (not shown) that is capable of generating, when the input apparatus 10 is moved and rotated by the user, electric power based on the movement and the rotation. Alternatively, the input apparatus 10 may be equipped with a loop coil or the like that generates electric power by external electromagnetic waves. Electric power generated by the electric power generation device and loop coil is charged in the battery 18. As a result, the user is no longer required to replace the battery 18.

In the example above, the case where the triaxial acceleration sensor 14 and the triaxial angular velocity sensor 15 as a motion detection portion and the pressure-sensitive sensor 13 and/or the static sensor as a grip force detection portion are used has been described. Here, the motion detection portion is not limited to the triaxial acceleration sensor 14 and the triaxial angular velocity sensor 15. Other examples of the motion detection portion include a velocity sensor (e.g., pitot tube), an angle sensor (e.g., geomagnetic sensor), and an angular acceleration sensor. Moreover, although the case where the motion detection portion and the grip force detection portion are used has been described in the example above, only one of the portions may be used (excluding fourth and fifth embodiments).

In the descriptions above, the operation target has been an image that is displayed 2- or 3-dimensionally on the display portion. However, the operation target is not limited thereto. For example, the operation target may be an actual physical body such as a conveyor robot and a humanoid.

The present disclosure contains subject matter related to that disclosed in Japanese Priority Patent Application JP 2010-160310 filed in the Japan Patent Office on Jul. 15, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An input apparatus, comprising:
an input apparatus main body that is used to make an input for operating an operation target;
a grip detection portion configured to detect that a user has gripped the input apparatus main body with at least a predetermined force;
a motion detection portion configured to detect a movement of the input apparatus main body and to output a movement detection value corresponding to the movement of the input apparatus main body;
a controller configured to transmit, in response to detecting the grip of the input apparatus main body, information for controlling the operation target based on the movement detection value;

a first response portion configured to return, when at least the grip of the input apparatus main body is detected, a first response to the user irrespective of a control of the controller; and
a second response portion configured to return a second response different from the first response to the user under the control of the controller.

2. The input apparatus according to claim 1, wherein:
the input apparatus main body comprises:
  a base portion comprising a first front surface;
  a shell-like portion comprising a second front surface and an inner surface that faces and covers the first front surface of the base portion, with a gap existing between the inner surface and the first front surface of the base portion; and a switch portion between the first front surface of the base portion and the inner surface of the shell-like portion, the grip detection portion being a switch mechanism that constitutes a part of the switch portion, and the first response portion being a click sense generation mechanism that constitutes a part of the switch portion and generates a sense of click as the first response.

3. The input apparatus according to claim 2, further comprising:
  a grip force detection portion between the first front surface of the base portion and the switch portion, and configured to detect a level of a grip force of the input apparatus main body and to output a grip force detection value corresponding to the level of the grip force.

4. The input apparatus according to claim 3, wherein the input apparatus main body further comprises a grip portion that covers the second front surface of the shell-like portion and is formed of a softer material than the base portion and the shell-like portion.

5. The input apparatus according to claim 1, wherein the first response portion returns the first response to the user when the grip of the input apparatus main body is detected by the grip detection portion and when the grip of the input apparatus main body is no longer detected.

6. The input apparatus according to claim 1, further comprising a grip force detection portion configured to detect a level of a grip force of the input apparatus main body and to output a grip force detection value corresponding to the level of the grip force, and wherein the controller controls the second response by the second response portion based on one of the movement detection value and the grip force detection value.

7. The input apparatus according to claim 1, further comprising a grip force detection portion configured to detect a level of a grip force of the input apparatus main body and to output a grip force detection value corresponding to the level of the grip force, and wherein the controller transmits the information for controlling the operation target based on the movement detection value and the grip force detection value in response to detecting the grip of the input apparatus main body.

8. The input apparatus according to claim 7, wherein, when the movement detection value is about zero, the controller executes processing to keep the operation target moving based on the grip force detection value.

9. An input apparatus, comprising:
an input apparatus main body that is used to make an input for operating an operation target;
a grip detection portion configured to detect that a user has gripped the input apparatus main body with at least a predetermined force;
a grip force detection portion configured to detect a level of a grip force of the input apparatus main body and to output a grip force detection value corresponding to the level of the grip force;
a controller configured to transmit, in response to detecting the grip of the input apparatus main body, information for controlling the operation target based on the grip force detection value;
a first response portion configured to return, when at least the grip of the input apparatus main body is detected, a first response to the user irrespective of a control of the controller; and
a second response portion configured to return a second response different from the first response to the user under the control of the controller.

10. An input apparatus, comprising:
an input apparatus main body that is used to make an input for operating an operation target;
a grip detection portion configured to detect that a user has gripped the input apparatus main body with at least a predetermined force;
a motion detection portion configured to detect a movement of the input apparatus main body and to output a movement detection value corresponding to the movement of the input apparatus main body;
a controller configured to transmit, in response to detecting the grip of the input apparatus main body, information for controlling the operation target based on the movement detection value; and
a first response portion configured to return, when at least the grip of the input apparatus main body is detected, a first response to the user irrespective of a control of the controller,
wherein the input apparatus main body comprises:
  a base portion comprising a first front surface;
  a shell-like portion comprising a second front surface and an inner surface that faces and covers the first front surface of the base portion, with a gap existing between the inner surface and the first front surface of the base portion; and
  a switch portion between the first front surface of the base portion and the inner surface of the shell-like portion, the grip detection portion being a switch mechanism that constitutes a part of the switch portion, and the first response portion being a click sense generation mechanism that constitutes a part of the switch portion and generates a sense of click as the first response.

11. An input apparatus, comprising:
an input apparatus main body that is used to make an input for operating an operation target;
a grip detection portion configured to detect that a user has gripped the input apparatus main body with at least a predetermined force;
a grip force detection portion configured to detect a level of a grip force of the input apparatus main body and to output a grip force detection value corresponding to the level of the grip force;
a motion detection portion configured to detect a movement of the input apparatus main body and to output a movement detection value corresponding to the movement of the input apparatus main body;
a controller configured to transmit, in response to detecting the grip of the input apparatus main body, information for controlling the operation target based on the movement detection value, wherein the controller transmits information for controlling the operation target based on the movement detection value and the grip force detection value in response to detecting the grip of the input apparatus main body; and a first response portion configured to return, when at least the grip of the input apparatus main body is detected, a first response to the user irrespective of a control of the controller.

12. The input apparatus according to claim 1, wherein the grip detection portion comprises a pressure-sensitive sensor, and wherein the motion detection portion comprises a tri-axial acceleration sensor and a tri-axial angular velocity sensor.

13. The input apparatus according to claim 12, wherein the pressure-sensitive sensor outputs a pressure value corresponding to the level of a grip force with which the user holds the input apparatus.

14. The input apparatus according to claim 1, wherein the transceiver transmits the information for controlling the operation target to a control apparatus.

15. The input apparatus according to claim 1, wherein the first response is generated when the user wants to start or stop an operation of the operation target when the user holds the input apparatus with the at least pre-determined force,
wherein the second response is generated when the user operates the input apparatus three-dimensionally, wherein the three-dimensional operation is based on a level of the grip of the input apparatus.

* * * * *